United States Patent
Foley et al.

(10) Patent No.: US 12,527,567 B2
(45) Date of Patent: Jan. 20, 2026

(54) SUTURING DEVICE

(71) Applicant: Durastat LLC, Austin, TX (US)

(72) Inventors: Kevin Foley, Germantown, TN (US); Adam Azzara, Austin, TX (US); Jens Johnson, Austin, TX (US)

(73) Assignee: DURASTAT LLC, Austin, TX (US)

(*) Notice: Subject to any disclaimer, the term of this patent is extended or adjusted under 35 U.S.C. 154(b) by 391 days.

(21) Appl. No.: 18/150,868

(22) Filed: Jan. 6, 2023

(65) Prior Publication Data

US 2024/0225633 A1    Jul. 11, 2024

(51) Int. Cl.
*A61B 17/04* (2006.01)
*A61B 17/06* (2006.01)

(52) U.S. Cl.
CPC .... *A61B 17/0469* (2013.01); *A61B 17/06066* (2013.01); *A61B 2017/0608* (2013.01)

(58) Field of Classification Search
CPC ................... A61B 2017/047; A61B 2017/0608
See application file for complete search history.

(56) References Cited

U.S. PATENT DOCUMENTS

| | | | |
|---|---|---|---|
| 5,403,328 A * | 4/1995 | Shallman | A61B 17/0469 606/139 |
| 5,468,251 A * | 11/1995 | Buelna | A61B 17/0493 606/139 |
| 5,503,634 A * | 4/1996 | Christy | A61B 17/0625 223/102 |
| 5,632,752 A * | 5/1997 | Buelna | A61B 17/0493 606/139 |
| 5,665,096 A * | 9/1997 | Yoon | A61B 17/062 606/139 |
| 10,610,215 B2 | 4/2020 | Anderson | |
| 10,709,443 B2 | 7/2020 | Anderson | |
| 10,918,379 B2 | 2/2021 | Kurd | |
| 2001/0023352 A1 * | 9/2001 | Gordon | A61B 17/0625 606/144 |
| 2002/0056460 A1 * | 5/2002 | Boyd | A61B 17/06061 128/898 |
| 2002/0068949 A1 * | 6/2002 | Williamson, IV | A61F 2/2409 606/139 |
| 2002/0173800 A1 * | 11/2002 | Dreyfuss | A61B 17/0057 606/139 |
| 2003/0181925 A1 * | 9/2003 | Bain | A61B 17/0469 606/144 |
| 2004/0236356 A1 * | 11/2004 | Rioux | A61B 17/0469 606/139 |

(Continued)

*Primary Examiner* — Shaun L David
(74) *Attorney, Agent, or Firm* — Rankin, Hill & Clark LLP

(57) ABSTRACT

A suturing device includes a cannula, a needle pusher, an actuator mechanism and a brace. The cannula includes a proximal portion and a distal portion. The distal portion includes a more proximal section, a needle compartment and a curved section. The more proximal section is located nearest the proximal portion of the cannula. The needle compartment defines a needle passage terminating in a terminal opening. The curved section is located between the needle compartment and the more proximal section. The needle pusher is provided at least in the distal portion. The actuator mechanism is operably connected with the needle pusher. The brace is on the distal portion connected with and spanning between the needle compartment and the more proximal section.

14 Claims, 7 Drawing Sheets

(56) References Cited

U.S. PATENT DOCUMENTS

| | | | |
|---|---|---|---|
| 2006/0276808 A1* | 12/2006 | Arnal | A61B 17/0469 606/148 |
| 2007/0244493 A1* | 10/2007 | Bjerken | A61B 17/1114 606/139 |
| 2009/0105743 A1* | 4/2009 | Chu | A61B 17/0401 606/1 |
| 2010/0057109 A1* | 3/2010 | Clerc | A61B 17/0469 606/144 |
| 2010/0113873 A1* | 5/2010 | Suzuki | A61B 1/00183 600/106 |
| 2016/0345953 A1* | 12/2016 | Russell | A61B 17/0401 |
| 2017/0360435 A1* | 12/2017 | Bhalla | A61B 17/062 |
| 2018/0221015 A1* | 8/2018 | Bhalla | A61B 17/06066 |
| 2018/0256160 A1* | 9/2018 | Kurd | A61B 17/0491 |
| 2018/0296208 A1* | 10/2018 | Kurd | A61B 17/0491 |
| 2019/0008506 A1* | 1/2019 | Kurd | A61B 17/06066 |
| 2019/0167255 A1* | 6/2019 | Anderson | A61B 17/06061 |
| 2019/0200975 A1* | 7/2019 | Anderson | A61B 17/0625 |
| 2019/0200976 A1* | 7/2019 | Kumar | A61B 17/0467 |
| 2019/0336122 A1* | 11/2019 | Kumar | A61B 17/062 |
| 2020/0352561 A1* | 11/2020 | Getz | A61B 17/0483 |
| 2023/0045276 A1* | 2/2023 | Kamrava | A61B 17/0485 |
| 2024/0366214 A1* | 11/2024 | Mims | A61B 1/00183 |

\* cited by examiner

SUTURING DEVICE

BACKGROUND

The present disclosure relates generally to surgery and the placement of sutures, and more particularly to devices and methods for suture repair of the tissue.

Surgical closure using sutures is one approach to tissue repair. Oftentimes a needle driver or similar device is used to locate and to pass a suture needle through the tissue to be repaired. The suture needle attaches at one end to a predetermined length of suture, which can be stored in a suture package. Other wound closure devices, such as staples, and other repair devices, like mesh or patch reinforcements, are frequently used for repair.

Locating the tissue repair devices, especially when working in areas where it is difficult for a surgeon to access such as when working through a tubular retractor or other portal, can be very challenging. U.S. Pat. No. 10,610,215 B2 discloses a suturing device that includes an elongate body, a needle holder, and an actuator. The needle holder defines a needle passage that holds a needle. The actuator is configured such that movement from a first operating position toward a second operating position moves the needle in an advance direction. The actuator includes a button and a spring biasing the actuator toward the second operating position. The button is operatively connected with the spring so as to preclude the spring from moving the actuator toward the second operating position until after the button has been moved from a non-actuated position toward an actuated position. The suturing device disclosed in U.S. Pat. No. 10,610,215 B2 is particularly well suited repairing a tear in the dura mater. When, however, repairing denser tissue, modifications to such a device are desired.

SUMMARY

In view of the foregoing, a suturing device is provided including a cannula, a needle pusher, an actuator mechanism and a brace. The cannula includes a proximal portion and a distal portion. The distal portion includes a more proximal section, a needle compartment and a curved section. The more proximal section is located nearest the proximal portion of the cannula. The needle compartment defines a needle passage terminating in a terminal opening. The curved section is located between the needle compartment and the more proximal section. The needle pusher is provided at least in the distal portion. The actuator mechanism is operably connected with the needle pusher. The brace is on the distal portion connected with and spanning between the needle compartment and the more proximal section.

DETAILED DESCRIPTION

Figure 1:
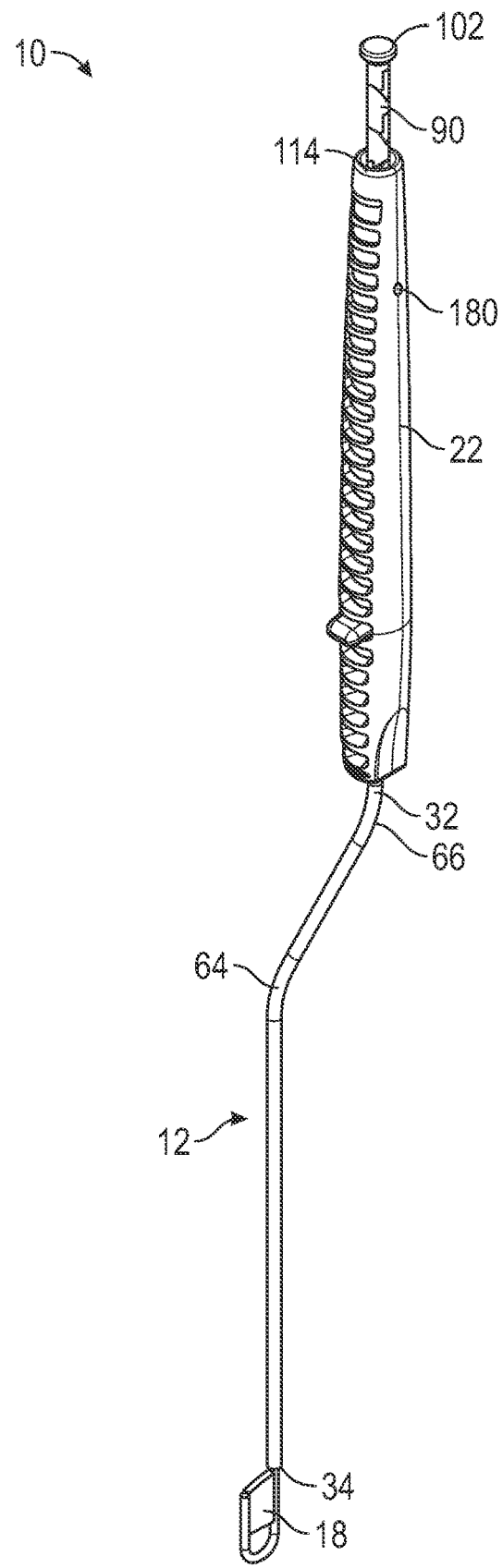
FIG. 1 is a perspective view of a suturing device.
Figure 2:
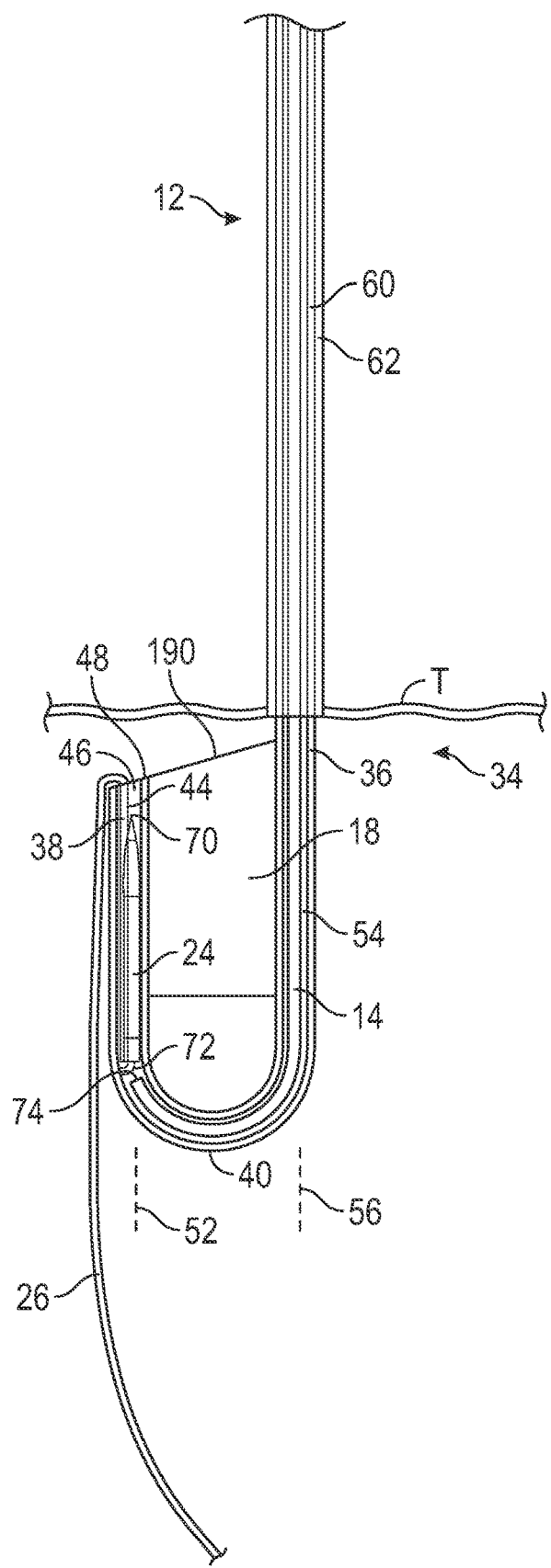
FIG. 2 is a cross-sectional view of the lower portion of the suturing device depicted in FIG. 1 positioned to repair a tissue tear.

FIGS. 1-4 depict a suturing device 10 including a cannula 12 (FIG. 1), a needle pusher 14 (FIG. 2), an actuator mechanism 16 (FIGS. 3 and 4) and a brace 18 (FIG. 1). With reference to FIG. 1, the suturing device 10 can further include a handle 22 connected with the cannula 12. With reference to FIG. 2, the suturing device 10 can further include a needle 24 and a suture 26 connected with the needle 24. The suturing device 10 is useful to repair tissue tears. The suturing device 10 is particularly useful during a minimally invasive surgical procedure that is performed through a tubular retractor or other small surgical portal to accurately locate the needle 24 and the suture 26, which are shown in FIG. 2, to facilitate passing the needle 24 through target tissue T to be sutured.

With reference to FIG. 1, the cannula 12 includes a proximal portion 32 and a distal portion 34. The proximal portion 32 is located nearer to and/or can be partially received in the handle 22. As more clearly seen in FIG. 2, the distal portion 34 includes a more proximal section 36, a needle compartment 38 and a curved section 40. The more proximal section 36 is located nearest the proximal portion 32 of the cannula 12. The needle compartment 38 defines a needle passage 44 terminating in a terminal opening 46. The curved section 40 is located between the needle compartment 38 and the more proximal section 36. A distal edge surface 48 of the needle compartment 38 defines the terminal opening 46. As more clearly seen in FIG. 2, the distal edge surface 48 of the needle compartment 38 slopes upwardly toward the proximal portion 32 of the cannula 12. In the illustrated embodiment, the distal edge surface 48 of the needle compartment 38 slopes upwardly at an internal angle of about 16 degrees from a plane measured perpendicular to a linear needle passage axis 52 in FIG. 2.

The needle passage 44 extends along the linear needle passage axis 52. This aids in accommodating the needle 24, which can be straight instead of curved, in the needle passage 44. As illustrated, the curved section 40 has an arc length of 180 degrees. The more proximal section 36 defines at least a portion of a needle pusher passage 54 in which at least a portion of the needle pusher 14 is received. The portion of the needle pusher passage 54 within the more proximal section 36 extends along a linear proximal section axis 56, which can be offset from and parallel with the linear needle passage axis 52 because of the 180 degree arc length of the curved section 40. However, in alternative configurations, the curved section 40 can have an arc length between 150 degrees and 210 degrees. For example, in FIG. 2A the arc length of the curved section 40 is less than 180 degrees, which results in the linear needle passage axis 52 not being perpendicular to the linear proximal section axis 56. Although not depicted, the arc length of the curved section 40 can be greater than 180 degrees.

As illustrated, the cannula 12 includes an inner cannula 60 received in an outer cannula 62 where the distal portion 34 of the cannula 12 is provided on the inner cannula 60. Nevertheless, it is contemplated that the cannula 12 can be made from a single tube or more than two tubes connected with one another. In the depicted embodiments, the cannula 12 is circular in a cross section taken normal to the longest dimension of the cannula 12, however, the cannula 12 could take alternative configurations, such as polygonal or U-shaped. The cannula 12 has a bayonet configuration in the illustrated embodiment; however, the cannula 12 could take alternative configurations, such as straight along a longitudinal axis. As illustrated in FIG. 1, the cannula 12 includes a more distal bend 64 and a more proximal bend 66 to form the bayonet configuration.

Figure 3:
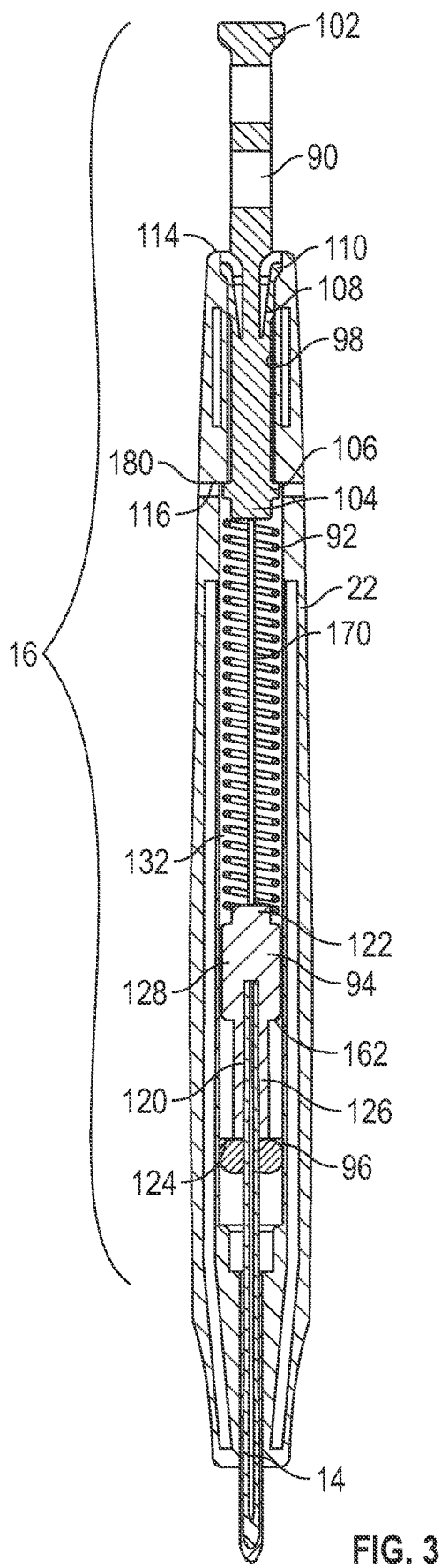
FIG. 3 is a cross-sectional view of a proximal portion of the suturing device depicted in FIG. 1.
Figure 4:
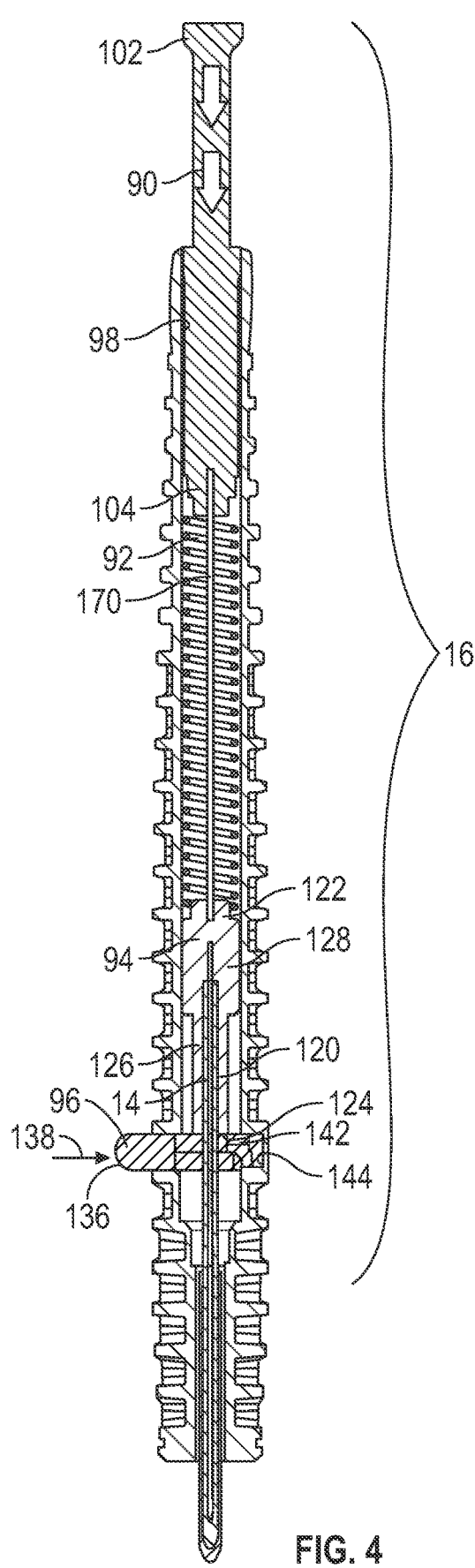
FIG. 4 is another cross-sectional view of the proximal portion of the suturing device depicted in FIG. 1 rotated 90 degrees from the view shown in FIG. 3.

With reference to FIGS. 3 and 4, the needle pusher 14 is operably connected with the actuator mechanism 16. The needle pusher 14 can be a wire, which can be made from nitinol. The needle pusher 14 is received in the cannula 12. More particularly, the needle pusher 14 is received in the needle pusher passage 54 located within the cannula 12. Upon actuation of the actuator mechanism 16, which will be described in more detail below, the needle pusher 14 is configured to operate through the curved section 40 to push the needle 24 in an advance direction through the terminal opening 46. The needle 24 includes a first end 70, which is pointed, and a second end 72 that is opposite the first end 70. The suture 26 connects with the second end 72 of the needle 24. In the illustrated embodiment, at least a portion of the suture 26 extends through the terminal opening 46 when the needle 24 is received in the needle compartment 38 prior to the actuator mechanism 16 being actuated.

Prior to actuation of the actuator mechanism 16, a distal end 74 of the needle pusher 14 is offset from the second end 72 of the needle 24. The needle pusher passage 54 extends into the curved section 40 of the distal portion 34 of the cannula 12, and prior to actuation of the actuator mechanism 16 a portion of the needle pusher 14 extends into the curved section 40 of the distal portion 34 of the cannula 12. The needle pusher passage 54 also extends through the more distal bend 64 and the more proximal bend 66 in the cannula 12 located in the proximal portion 32 of the cannula 12.

With reference to FIGS. 3 and 4, the actuator mechanism 16 is operably connected with the needle pusher 14. The actuator mechanism 16 includes a plunger 90, a spring 92, a shuttle 94, and a button 96. The plunger 90 is movable between an extended position and a depressed position. When the button 96 is not depressed, which is the position shown in FIG. 4, movement of the plunger 90 from the extended position toward the depressed position compresses the spring 92 against the shuttle 94. The spring 92 exerts a biasing force on the shuttle 94 in the advance direction when the plunger 90 is in the depressed position. The button 96 is operably engaged with the shuttle 94. The spring 92 biases the shuttle 94 in the advance direction after the button 96 is depressed, which moves the needle pusher 14 and pushes the needle 24 in the advance direction.

The plunger 90 is received in an upper bore 98 provided in the handle 22. The plunger 90 includes a proximal head 102 and a distal end portion 104. A radial shoulder 106 is offset from the distal end portion 104 toward the proximal head 102. The distal end portion 104 and the radial shoulder 106 operate as a locating feature for the spring 92. The plunger 90 further includes a resilient finger 108 (two resilient fingers are shown in FIG. 3). A barb 110 is provided at a distal end of each resilient finger 108. As mentioned above, the plunger 90 is movable between and extended position, which is shown in FIG. 3, and a depressed position where the proximal head 102 is brought closer to and can come in contact with a distal end 114 of the handle 22. A thumb of the operator of the suturing device 10 can be used to depress the plunger 90 moving the plunger 90 from the extended position toward the depressed position. A shoulder 116 can be provided in the handle 22 and the radial shoulder 106 contacts the shoulder 116 in the handle 22 when the plunger 90 is in the extended position. As the plunger 90 is depressed, the resilient fingers 108 compress while traveling through the upper bore 98 until passing the shoulder 116 in the handle 22 in the depressed position. When in the depressed position, the resilient finger 108, and more particularly the barb 110 on the resilient finger 108, selectively engages the shoulder 116 in the handle 22 to maintain the plunger 90 in the depressed position.

The shuttle 94 includes a bore 120, which receives the needle pusher 14 to connect the needle pusher 14 with the shuttle 94. The needle pusher 14 is fixed to the shuttle 94 such that movement of the shuttle 94 results in movement of the needle pusher 14. The shuttle 94 includes a proximal end portion 122 that provides a locating feature for the spring 92. The shuttle 94 also includes a button contact surface 124, which is a distal end surface of the shuttle 94 as illustrated in FIGS. 3 and 4. The shuttle 94 also includes a reduced cross-sectional portion 126 extending from a relatively larger cross-sectional portion 128. The relatively larger cross-sectional portion 128 has a diameter slightly smaller than an inner diameter of an actuator cavity 132 provided in the handle to allow for translational movement of the shuttle 94 within the actuator cavity 132.

The button 96 includes an operator contact surface 136 and operates as a push button in the illustrated embodiment whereby an operator, such as a surgeon, depresses the button 96 in the direction of arrow 138 moving the button 96 from the non-actuated position toward the actuated position. The button 96 also includes a finger 142 (see also FIG. 5) which contacts an inner side surface 144 provided in the handle 22 to bias the button 96 toward the non-actuated position. As the operator depresses the button 96 in the direction of arrow 138, the finger 142 bends and operates similar to a spring.

Figure 5:
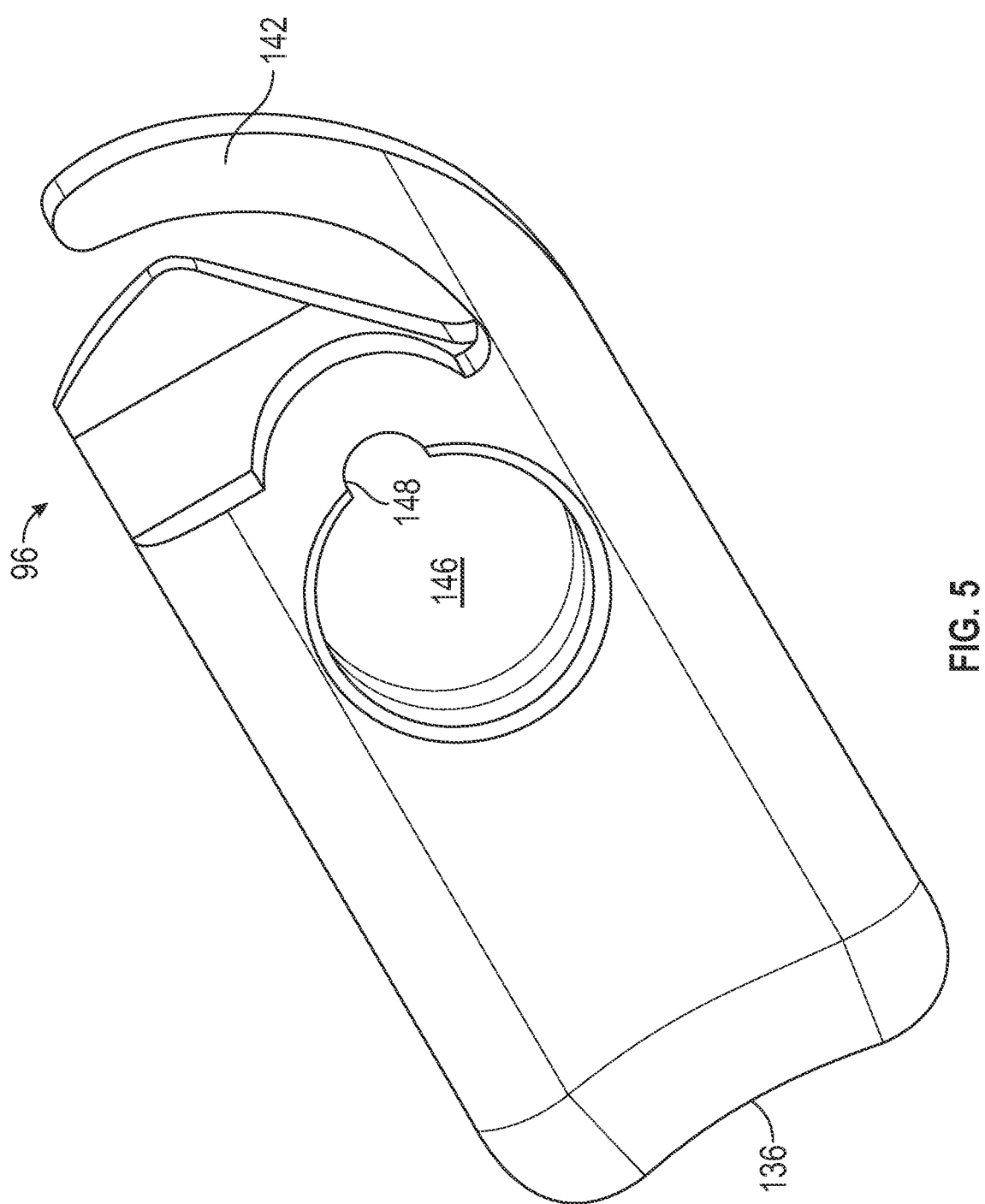
FIG. 5 is a perspective view of a button of the suturing device of FIG. 1.
Figure 6:
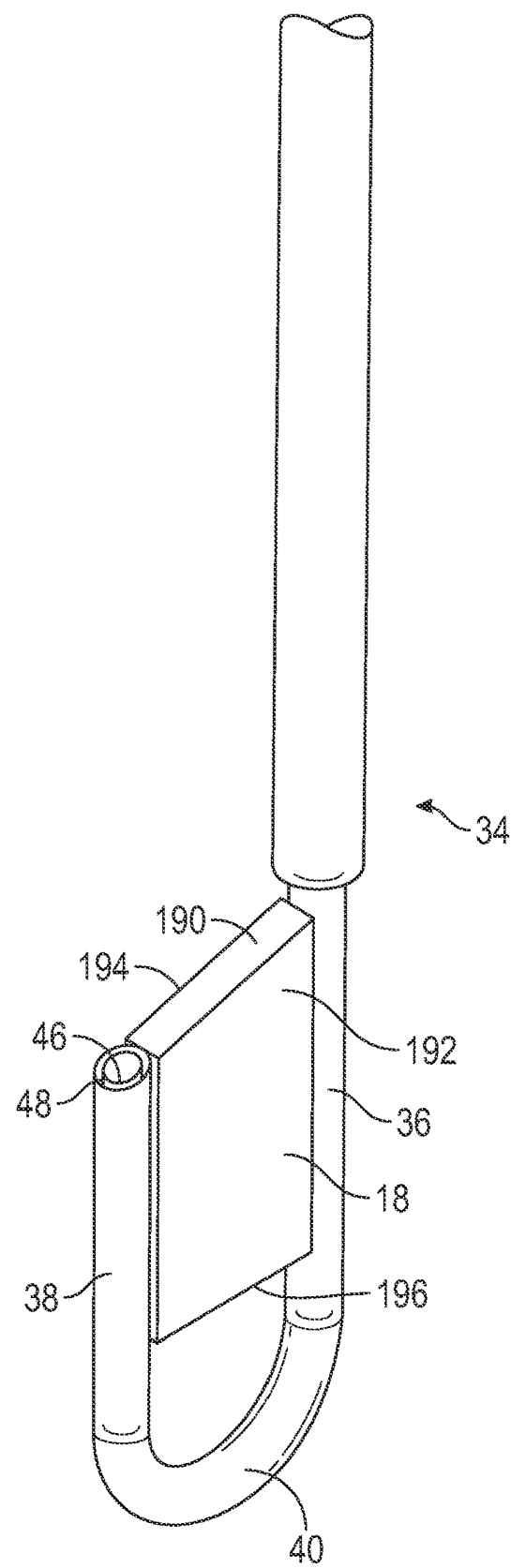
FIG. 6 is a perspective view of a distal portion of the suturing device of FIG. 1.

As more clearly seen in FIG. 5, the button 96 includes an opening made up of a main portion 146 and a smaller portion 148. The main portion 146 of the opening is configured to receive the reduced cross-sectional portion 126 of the shuttle 94 when the main portion 146 of the opening is aligned with the reduced cross-sectional portion 126. This occurs when the operator presses the operator contact surface 136 in the direction of arrow 138 thus moving the button 96 to the right per the orientation shown in FIG. 4. The main portion 146 of the opening, however, is smaller than the relatively larger cross-sectional portion 128 of the shuttle 94. Accordingly, the travel distance of the shuttle 94 is limited by the distance between button contact surface 124 and a shoulder 162 where the reduced cross-sectional portion 126 transitions to the relatively larger cross-sectional portion 128. With reference back to FIG. 5, the smaller portion 148 of the slider opening is configured to allow for passage of the needle pusher 14 to allow for the connection of the needle pusher 14 to the shuttle 94. When the button 96 is in the non-actuated position (shown in FIGS. 1 and 4), the button 96 contacts the shuttle 94 to preclude movement of the shuttle 94 with respect to the button 96. When an operator moves the button 96 in the direction of arrow 138, the button 96 is moved in the direction of arrow 138 which allows the main portion 146 of the slider opening to align with the reduced cross-sectional portion 126 of the shuttle 94, and the spring 92 moves the shuttle 94 downwardly (per the orientation shown in FIG. 4) such that the reduced cross-sectional portion 126 passes through the main portion 146 of the opening thus moving the needle pusher 14 and thus moving the needle 24 in the advance direction toward the terminal opening 46.

With reference to FIGS. 3 and 4, a tether 170 connects the plunger 90 with the shuttle 94. Similar to a conventional cable, the tether 170 is configured to sustain a tensile force, but not a compressive force. The tether 170 is useful to pull the plunger 90, and more particularly the reduced cross-sectional portion 126, back through the main portion 146 of the slider opening after the needle 24 has been deployed, which can be useful if re-loading of the suturing device 10 is desired.

The handle 22 connects with the cannula 12. The spring 92 and the shuttle 94 are positioned inside the handle 22. The plunger 90 and the button 96 are at least partially received in the handle 22. As mentioned above, the plunger 90 includes the resilient finger 108 which selectively engages the shoulder 116 in the handle 22 to maintain the plunger 90 in the depressed position. With reference to FIG. 3, the handle 22 includes an opening 180 aligned with the shoulder 116 in the handle 22 through which the resilient finger 108, and more particularly the barb 110, is accessible when the plunger 90 is in the depressed position. A small tool can be inserted into the opening 180 in the handle 22 to push the barb 110 away from contacting the shoulder 116 to allow the plunger 90 to be pulled outwardly from the handle 22 toward the extended position from the depressed position. With the tether 170 connecting the plunger 90 with the shuttle 94, movement of the plunger 90 from the depressed position toward the extended position pulls the plunger 90, and more particularly the reduced cross-sectional portion 126, back through the main portion 146 of the slider opening.

With reference back to FIG. 1, the brace 18 on the distal portion 34 connects with and spans between the needle compartment 38 and the more proximal section 36. The brace 18 ties the needle compartment 38 to the more proximal section 36 to provide a more robust distal portion 34 as compared to without the brace 18. Also, the brace 18 can be shaped in a manner to aid in removal of the suturing device 10 from the patient after the needle 24 has been deployed.

Figure 2A:
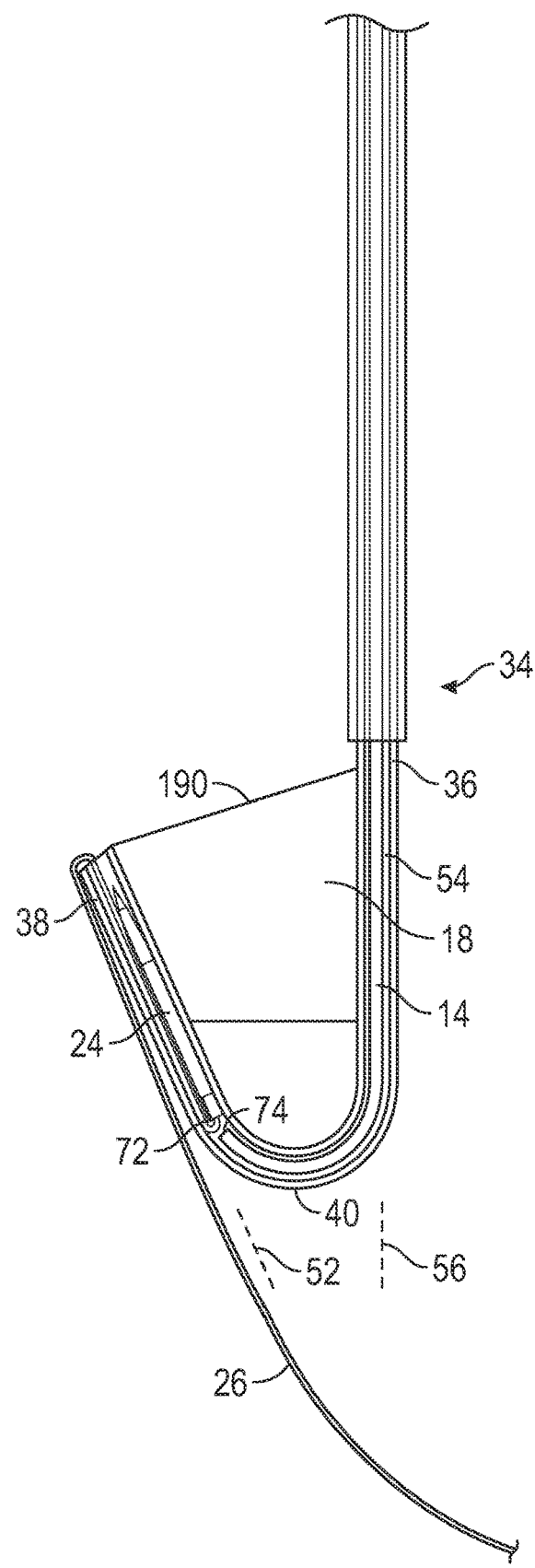
FIG. 2A is a cross-sectional view of the lower portion of the suturing device according to an alternative embodiment.

The brace 18 includes an upper surface 190 facing toward the proximal portion 32. The upper surface 190 slopes upwardly toward the more proximal section 36 from adjacent the terminal opening 46 toward the more proximal section 36. As illustrated, the upper surface 190 is planar and slopes upwardly at an internal angle of about 16 degrees from a plane measured perpendicular to the linear proximal section axis 56 in FIGS. 2 and 2A. In the illustrated embodiment in FIG. 2, the upper surface 190 is flush with a portion of the distal edge surface 48 of the needle compartment 38 that defines the terminal opening 46, which can aid in removal of the suturing device 10 from the patient after the needle 24 has been deployed. Alternatively, the upper surface 190 can be slightly offset above or below the portion of the distal edge surface 48 of the needle compartment 38 that defines the terminal opening 46 or depicted as shown in FIG. 2A. Referring back to the illustrated embodiment of FIG. 2, the distal edge surface 48 of the needle compartment 38 slopes upwardly toward the proximal portion 32 and is co-planar with the upper surface 190 of the brace 18. The upper surface 190 of the brace 18 in the illustrated embodiment has a width measured perpendicular to a distance between the needle compartment 38 and the more proximal section 36, and the width of the upper surface 190 is equal to an outer diameter of the needle compartment 38 around the terminal opening 46. The brace 18 also includes planar side surfaces 192, 194 that are parallel to one another and parallel with the linear needle passage axis 52 and linear proximal section axis 56. The brace 18 also includes a lower surface 196 facing away from the proximal portion 32. In the illustrated embodiment, the lower surface 196 is spaced from the curved section 40.

Figure 7:
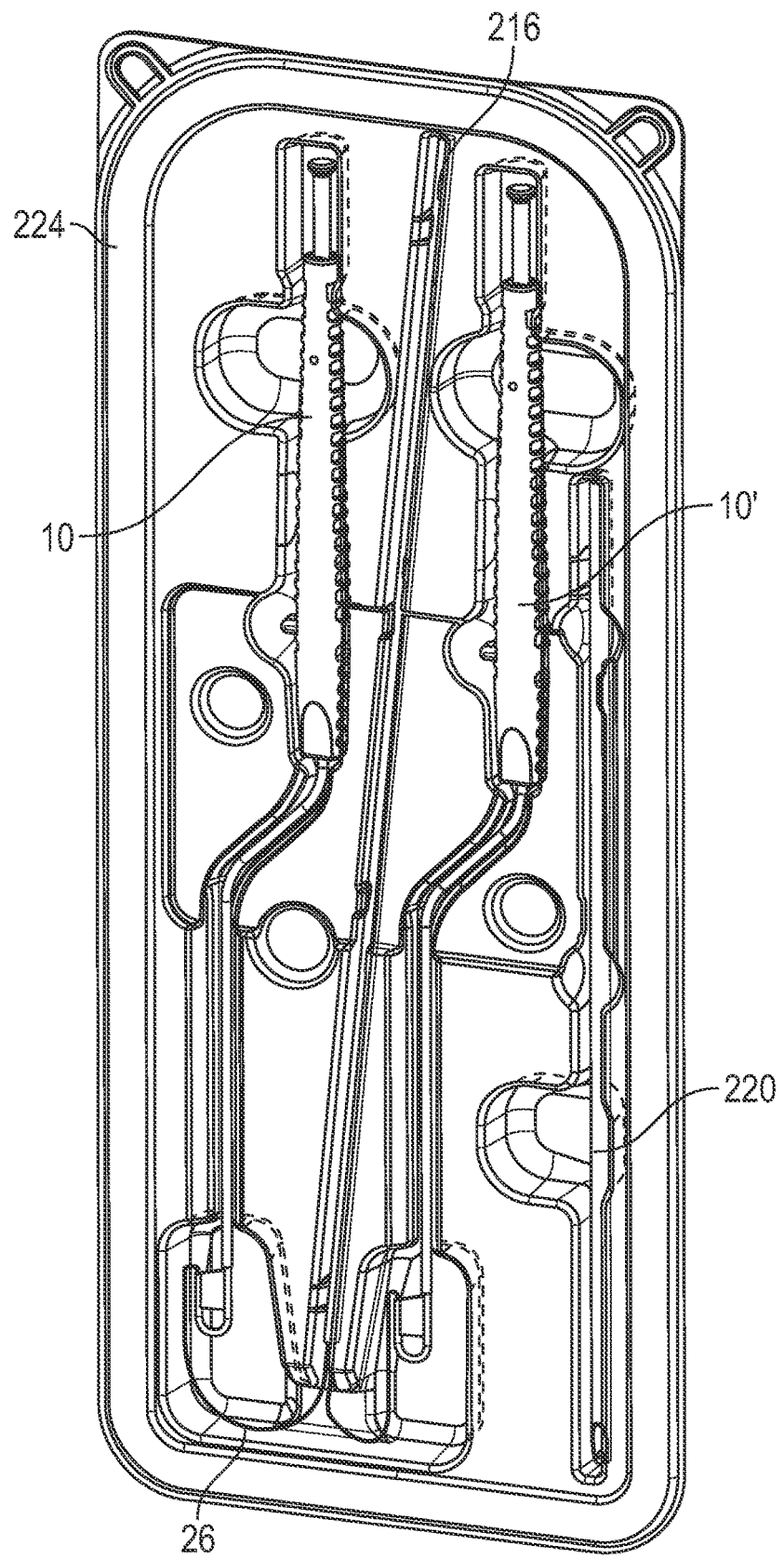
FIG. 7 is a perspective view of a kit including two suturing devices similar to those shown in FIG. 1.

With reference to FIG. 7, a suturing kit 210 includes two suturing devices 10, 10', which can be identical in configuration, a suture holder 216, the suture 26, and a knot pusher 220. The suturing devices 10, 10', the suture holder 216, the suture 26, and the knot pusher 220 are received in a package including a package base 224 and are covered by a cover sheet (not shown) similar to a known cover sheet for packaging sterile surgical instruments. The suture 26 depicted in FIG. 7 is a double-armed suture having one needle 24 (see FIG. 2) disposed in the suturing device 10 and another similar needle (not visible) at the other end disposed in the suturing device 10'. The suture 26 is doubled over within the suture holder 216 in a similar manner to that described in U.S. Pat. No. 10,835,236 B2. The suture holder 216 is positioned between the suturing devices 10, 10' when placed in the package base 224. This inhibits tangling of the suture 26 when the suturing devices 10, 10' are removed from the package base 224.

A suturing device and kit have been described above with particularity. Modifications and alterations will occur to those upon reading and understanding the above detailed description. The invention, however, is not limited to only the embodiments described above. Instead, the invention is broadly defined by the appended claims and the equivalents thereof.

The invention claimed is:

1. A suturing device comprising:
a cannula including a proximal portion and a distal portion, the distal portion including a more proximal section, a needle compartment and a curved section, the more proximal section being located nearest the proximal portion of the cannula, the needle compartment defining a needle passage terminating in a terminal opening, and the curved section located between the needle compartment and the more proximal section;
a needle pusher provided at least in the distal portion;
an actuator mechanism operably connected with the needle pusher; and
a brace on the distal portion connected with and spanning between the needle compartment and the more proximal section, wherein the brace includes an upper surface facing toward the proximal portion, wherein the upper surface is flush with or offset below a portion of a distal edge surface of the needle compartment that defines the terminal opening prior to and after a needle has been deployed from the needle compartment leaving the terminal opening exposed.

2. The suturing device of claim 1, wherein the upper surface slopes upwardly toward the more proximal section from adjacent the terminal opening toward the more proximal section.

3. The suturing device of claim 2, wherein the distal edge surface of the needle compartment slopes upwardly toward the proximal portion and is co-planar with the upper surface of the brace.

4. The suturing device of claim 2, wherein the upper surface of the brace has a width measured perpendicular to a distance between the needle compartment and the more proximal section, and the width of the upper surface is equal to an outer diameter of the needle compartment around the terminal opening.

5. The suturing device of claim 2, wherein the brace includes a lower surface facing away from the proximal portion, wherein the lower surface is spaced from the curved section.

6. The suturing device of claim 1, wherein the curved section has an arc length between 150 degrees and 210 degrees.

7. The suturing device of claim 6, wherein the curved section has an arc length of 180 degrees.

8. The suturing device of claim 7, wherein the needle passage extends along a linear needle axis and wherein the more proximal section defines at least a portion of a needle pusher passage in which at least a portion of the needle pusher is received, wherein the portion of the needle pusher passage within the more proximal section extends along a linear proximal section axis, which is offset from and parallel with the linear needle axis.

9. The suturing device of claim 1, wherein the cannula includes an inner cannula received in an outer cannula, wherein the distal portion is provided on the inner cannula.

10. A suturing device comprising:
a cannula including a proximal portion and a distal portion, the distal portion including a more proximal section, a needle compartment and a curved section, the more proximal section being located nearest the proximal portion of the cannula, the needle compartment defining a needle passage extending along a linear needle passage axis and terminating in a terminal opening, and the curved section located between the needle compartment and the more proximal section;
a needle pusher provided at least in the distal portion;
an actuator mechanism operably connected with the needle pusher;
a brace on the distal portion connected with and spanning between the needle compartment and the more proximal section; and
a needle, which is straight, positioned in the needle passage, wherein the needle pusher is configured to operate through the curved section to push the needle in an advance direction through the terminal opening, wherein the needle includes a first end, which is pointed, and a second end, wherein the first end is offset below the terminal opening prior to the actuator mechanism being actuated.

11. The suturing device of claim 10, wherein the more proximal section defines at least a portion of a needle pusher passage in which at least a portion of the needle pusher is received, wherein the portion of the needle pusher passage within the more proximal section extends along a linear proximal section axis, which is offset from and parallel with the linear needle passage axis.

12. The suturing device of claim 11, wherein the needle pusher passage extends into the curved section.

13. The suturing device of claim 12, wherein the needle pusher passage extends through a bend in the cannula located in the proximal portion or nearer to the proximal portion as compared to the curved section.

14. The suturing device of claim 11, further comprising a suture connected with the second end of the needle, wherein at least a portion of the suture extends through the terminal opening when the needle is received in the needle compartment prior to the actuator mechanism being actuated.

* * * * *